United States Patent
Oh et al.

(10) Patent No.: US 9,549,235 B2
(45) Date of Patent: Jan. 17, 2017

(54) USER INTERFACE APPARATUS USING SPEAKER AND METHOD THEREOF

(71) Applicant: Hyundai Motor Company, Seoul (KR)

(72) Inventors: Kwang Myung Oh, Daejeon (KR); Sung Min Park, Seoul (KR); Hui Sung Lee, Gyeonggi-do (KR); Sung Jin Sah, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 160 days.

(21) Appl. No.: 14/249,594

(22) Filed: Apr. 10, 2014

(65) Prior Publication Data

US 2015/0189410 A1    Jul. 2, 2015

(30) Foreign Application Priority Data

Dec. 26, 2013 (KR) ............ 10-2013-0164473

(51) Int. Cl.
*H04R 3/00* (2006.01)
*H04R 1/00* (2006.01)
*G10L 17/22* (2013.01)
*G06F 3/00* (2006.01)

(52) U.S. Cl.
CPC ........ *H04R 1/00* (2013.01); *G06F 3/00* (2013.01); *G10L 17/22* (2013.01); *H04R 3/00* (2013.01); *H04R 2430/00* (2013.01); *H04R 2430/01* (2013.01); *H04R 2499/13* (2013.01)

(58) Field of Classification Search
CPC ....... G10L 17/22; H04R 1/00; H04R 2430/00; H04R 2430/01; H04R 2499/13; H04R 3/00; G06F 3/00
See application file for complete search history.

(56) References Cited

U.S. PATENT DOCUMENTS

| | | | |
|---|---|---|---|
| 6,574,346 B1 | 6/2003 | Tanaka | |
| 7,966,084 B2 * | 6/2011 | Bengtsson et al. | ............ 700/94 |
| 2012/0120010 A1 * | 5/2012 | Yu et al. | ........................ 345/173 |
| 2012/0162143 A1 * | 6/2012 | Kai et al. | ...................... 345/177 |
| 2014/0136050 A1 * | 5/2014 | Lee et al. | ........................ 701/36 |

FOREIGN PATENT DOCUMENTS

| | | |
|---|---|---|
| JP | 2000-056872 A | 2/2000 |
| JP | 2011-227683 A | 11/2011 |

(Continued)

*Primary Examiner* — Regina N Holder
(74) *Attorney, Agent, or Firm* — Mintz Levin Cohn Ferris Glovsky and Popeo, P.C.; Peter F. Corless (57) ABSTRACT

A user interface apparatus using a speaker to control device operations by utilizing a speaker and a method thereof are provided. The user interface apparatus includes a user input pad that forms at least a portion of the exterior of a speaker and is configured to generate an impact sound wave based on an external impact An impact sound wave recognizer is configured to receive feedback of an output signal output via the speaker and separate a reverse current signal due to the impact sound wave included in the feedback signal. In addition, a controller is configured to analyze a waveform of the reverse current signal separated by the impact sound wave recognizer to recognize a user input pattern, and output a control signal that corresponds to the recognized user input pattern. The device operations of various devices may be controlled by tapping or flicking the exterior of a speaker.

16 Claims, 4 Drawing Sheets

(56) References Cited

FOREIGN PATENT DOCUMENTS

| KR | 10-2006-0001112 A | 1/2006 |
| KR | 10-2008-0050169 A | 6/2008 |
| KR | 10-0998926 | 12/2010 |
| KR | 10-2013-0032994 A | 4/2013 |
| KR | 10-2013-0072562 A | 7/2013 |
| KR | 10-1371749 B1 | 3/2014 |

* cited by examiner

USER INTERFACE APPARATUS USING SPEAKER AND METHOD THEREOF

CROSS-REFERENCE TO RELATED APPLICATION

This application is based on and claims priority from Korean Patent Application No. 10-2013-0164473, filed on Dec. 26, 2013 in the Korean Intellectual Property Office, the disclosure of which is incorporated herein in its entirety by reference.

BACKGROUND

Field of the invention

The present invention relates to a user interface apparatus, and more particularly, to a user interface apparatus that uses a speaker that outputs a control signal to operate functions of devices based on a user input via a speaker, and a method thereof.

Description of the Prior Art

Conventional devices are mostly manipulated by analog buttons. However, as touchscreens are increasingly employed in devices, user interface schemes such as a graphic user interface (GUI) have been applied. However, an operation through the conventional analog buttons and control system has a limitation in extending functions such as searching, illumination ON/OFF, volume-up or volume-down, and the like. In particular, the number of buttons increases as the types of functions increase, but due to spatial restrictions of devices, the number of buttons may not be increased unlimitedly. In addition, a touch interface may be inconvenient since a user needs to search and control a corresponding menu, while viewing a display screen of the device.

SUMMARY

Accordingly, the present invention provides a user interface apparatus using a speaker that outputs a control signal to operate a function of a device based on a user input applied (e.g., input) via a speaker, and a method thereof.

In one aspect of the present invention, a user interface apparatus using a speaker may include: a user input pad that forms at least a portion of the exterior of a speaker and may be configured to generate an impact sound wave based on an external impact; an impact sound wave recognizer configured to receive feedback of an output signal output via the speaker and separate a reverse current signal due to the impact sound wave included in the feedback signal; and a controller configured to analyze a waveform of the reverse current signal separated by the impact sound wave recognizer to recognize a user input pattern, and output a control signal that corresponds to the recognized user input pattern.

The impact sound wave may be a sound wave generated in response to a user tap, flick, or the like to the user input pad using an input unit such as his or her finger, a stick, a rubber, or a pen. The user input pad may be configured to directly or indirectly deliver the impact sound wave to a vibration plate of the speaker. The reverse current signal may be a signal generated based on a change in a movement of a voice coil of the speaker due to the impact sound wave. When an audio signal output via the speaker exists, the reverse current signal may distort the audio signal. The impact sound wave recognizer may be configured to compare the feedback signal with an audio signal output from an audio output unit to the speaker and extract a signal of a different region. The controller may be configured to recognize a user input pattern based on a strength of the external impact, number of occurrences of external impact, interval between the occurrences of external impact, and an input unit, and map a control signal that corresponds to the user input pattern.

In another aspect of the present invention, a user interface method using a speaker may include: receiving feedback of an output signal output via a speaker; separating a reverse current signal from the feedback output signal; analyzing a waveform of the separated reverse current signal; and outputting a control signal that corresponds to a user input pattern recognized through the waveform analysis.

The reverse current signal may be generated by the speaker due to an impact sound wave generated based on a user input applied to the exterior of the speaker. The user input may be a sound wave generated when a user taps or flicks the exterior of the speaker using an input unit such as his or her finger, a stick, a rubber, or a pen. In the separating of the reverse current signal, the feedback signal from the speaker may be compared with an audio signal transmitted to the speaker, and a signal of a region different from the audio signal transmitted to the speaker may be extracted from the feedback signal. In the analyzing of the waveform, the user input pattern may be recognized based on the strength of a user input, number of user inputs, an interval between the user inputs, and an input unit through the waveform of the separated reverse current signal. In the outputting of the control signal, the control signal mapped based on the user input pattern and a device type may be output

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Hereinafter, exemplary embodiments of the present invention will be described in detail with reference to the accompanying drawings.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
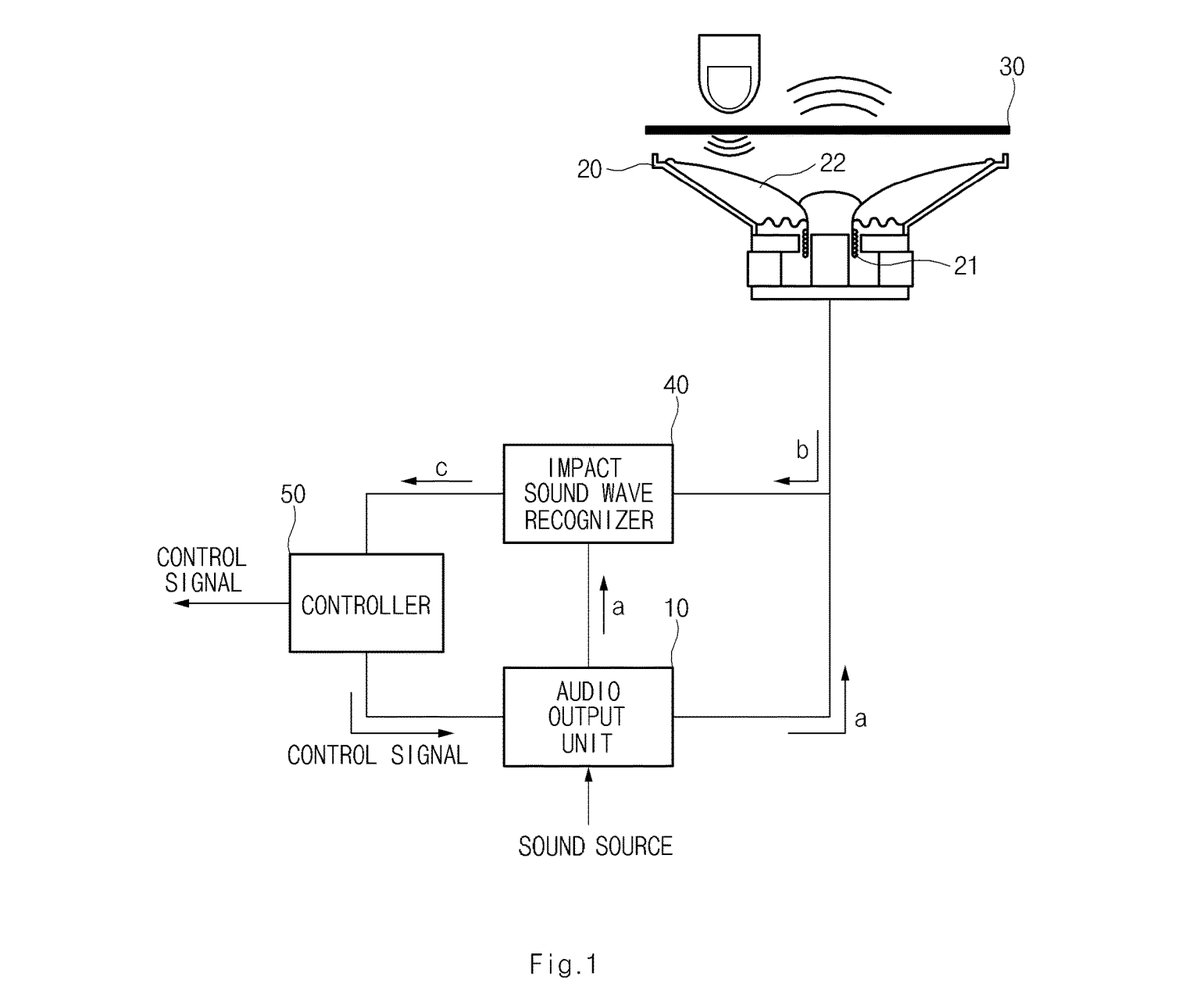
FIG. 1 is an exemplary block diagram illustrating a user interface apparatus using a speaker according to an exemplary embodiment of the present invention.
Figure 2:
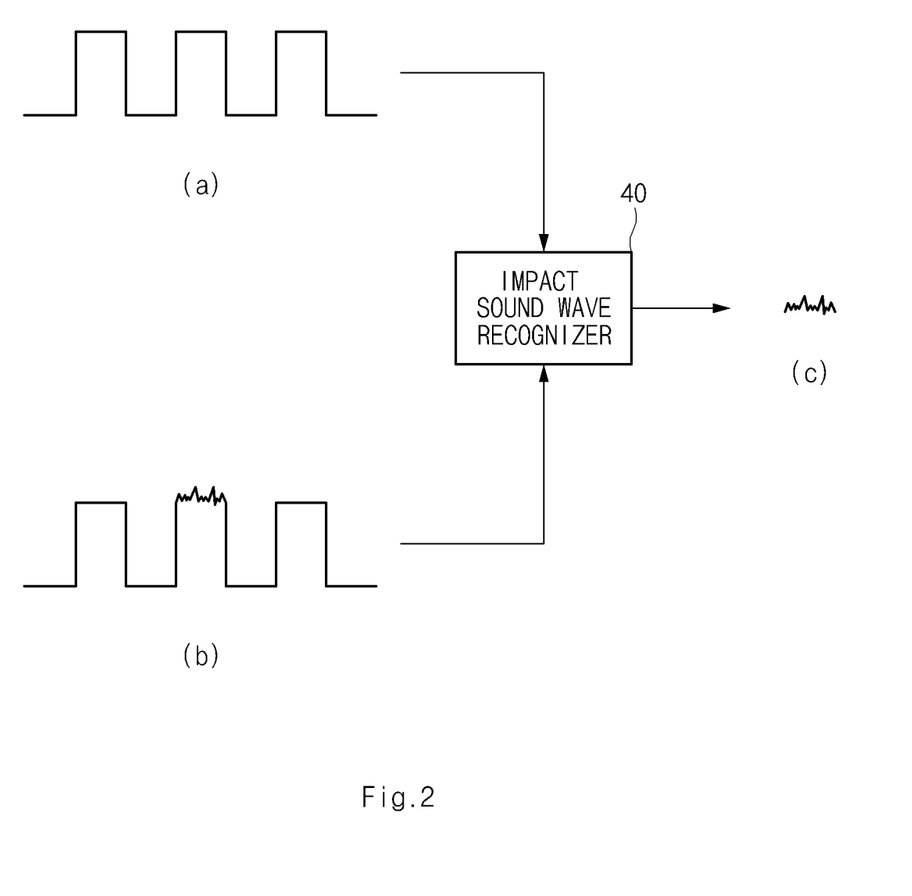
FIG. 2 is an exemplary view illustrating an operation of an impact sound wave recognizer of FIG. 1 according to an exemplary embodiment of the present invention.

FIG. 1 is an exemplary block diagram illustrating a user interface apparatus using a speaker according to an exemplary embodiment of the present invention, and FIG. 2 is an exemplary view illustrating an operation of an impact sound wave recognizer of FIG. 1. As illustrated in FIG. 1, a user interface apparatus according to an exemplary embodiment of the present invention may include an audio output unit 10, a speaker 20, a user input pad 30, an impact sound wave recognizer 40, and a controller 50.

The audio output unit 10 may be executed by the controller 50 and configured to receive sound source data, reproduce the received sound source data, and output the reproduced audio signal. The audio output unit 10 may include a digital-to-analog converter (DAC) and an amplifier. In particular, the DAC may be configured to convert the sound source data from a digital signal to an analog signal, and the amplifier may be configured to amplify a signal output from the DAC and output the amplified signal. The speaker 20 may be configured to output the audio signal output from the audio output unit 10 to the exterior. A voice coil 21 of the speaker 20 may be configured to receive the audio signal (e.g., electrical signal) and deliver the received audio signal to a vibration plate 22. When a current flows to the voice coil 21, the voice coil may move vertically (e.g., upward and downward) by electromagnetic force to allow the connected vibration plate 22 to vibrate air to generate a sound.

The user input pad 30 may form an outward appearance with respect to at least a portion of the speaker 20 and may be configured to generate an impact sound wave based on the external impact In other words, as illustrated in FIG. 1, the user input pad 30 may be disposed in front of the speaker 20 and may be configured to directly or indirectly deliver the impact sound wave based on a user input (e.g., external impact) to the vibration plate 22. In particular, the user input (e.g., external impact) may refer to a behavior such as tapping, flicking, or the like, the user input pad 30 using an input tool such as the user's finger, a stick, a rubber, a pen, or the like.

When the impact sound wave generated in the user input pad 30 is transmitted to the vibration plate 22, a movement of the voice coil 21 may be affected. Accordingly, a reverse current (e.g., counter electromotive force) signal may be generated by electromagnetic induction based on the movement of the voice coil 21. When an audio signal output through the voice coil 21 exists, the reverse current signal based on the impact sound wave may be synthesized with the audio signal to distort the audio signal. The audio signal synthesized with the reverse current signal may be fed back to the impact sound wave recognizer 40. Meanwhile, when an audio signal output through the voice coil 21 does not exist, the reverse current signal may be fed back to the impact sound wave recognizer 40. Additionally, the user input pad 30 may be formed of any material as long as the user input pad 30 may generate a sound wave based on impact applied from the exterior and transmit the sound wave.

The impact sound wave recognizer 40 may be executed by the controller 50 and configured to receive feedback of an output signal b output via the speaker 20 and separate the reverse current signal c based on the user input from the feedback signal b. In other words, the impact sound wave recognizer 40 may be configured to compare the feedback signal b from the speaker 20 with an audio signal (e.g., output signal), as a reference signal, output from the audio output unit 10 and separate the signal c of a region having a difference between the two signals from the feedback signal b. For example, as illustrated in FIG. 2, when the audio signal such as a is received from the audio output unit 10 and the feedback signal such as b is received from the speaker 20, the impact sound wave recognizer 40 may be configured to compare the two signals and extracts a signal of a region distorted by external impact.

The controller 50 may be configured to analyze a waveform of the reverse current signal separated by the impact sound wave recognizer 40 to recognize a user input pattern (e.g., a tapping pattern) and output a control signal mapped to the recognized user input pattern. In particular, the controller 50 may be configured to recognize a user input pattern based on a strength of impact due to tapping, number of occurrences of impact due to tapping, an interval between occurrences of impact due to tapping, and an input tool (e.g., input unit) by analyzing the waveform of the reverse current signal, and may be configured to map control signals that correspond to the user input pattern as shown in Table 1 below.

TABLE 1

| Input pattern | Control signal | Description |
| --- | --- | --- |
| ★ ★ | AUI ON/OFF | When audio user interface (AUI) is initially executed: AUI input mode While AUI being executed: AUI termination |
| ‹⋈⋈› | search | Left/right movement within depth |
| ⋈⋈ | mute | Mute currently played media |
| ⊡X1 | Depth movement/execution | Enter depth by one stage, executed when there is no more depth |
| ⊡X2 | Hot key | Reproduce with recently executed file or channel, executed (cooperated) by recent setting Perform factory default/user generated function (heating, sunroof) |
| ‹⊡› | Track/channel search (air volume adjustment) | Adjust object having phased attributes Right tap: next left tap: |

TABLE 1-continued

| Input pattern | Control signal | Description |
|---|---|---|
| | | previous |
| | | (right tap: air volume increase, left tap: air volume decrease in cooperation mode) |
| ▭+ | Volume adjustment (temperature adjustment) | Adjust object having attributes of continuous range Right tap: volume up left tap: volume down |
| ▭ X1 | Move to upper depth | Move to upper depth from current depth by one stage |
| ▭ X2 | Move to uppermost portion | Move to the uppermost depth |

Here, the symbols ▭, ▭, O, I, ★, ∿ indicate simultaneous left/right input, individual left/right input, nail input, fingertip input, knuckle input, and flicking, respectively. In this manner, a user input pattern may be changed even by an input tool (e.g., nail, fingertip, knuckle, palm, and the like), as well as an input type (e.g., input method), and when it is discriminated by applying a classifier (not shown), various functions may be extendedly implemented. The audio output unit 10 may be configured to adjust an audio output based on a control signal output from the controller 50. For example, when a stop command is received from the controller 50 while music is being played, the audio output unit 10 may be configured to stop the output of an audio signal.

In the foregoing exemplary embodiment, the example in which the audio output is controlled based on the control signal output from the controller 50 is described, but the present invention is not limited thereto and it may be implemented such that an operation (e.g., function) of a device connected to the user interface apparatus may be controlled. For example, when the user interface apparatus is connected to a device such as a navigation device, the controller 50 of the user interface apparatus may be configured to recognize a device type and map a control signal based on the recognized device type and a user input pattern. Thereafter, the controller 50 may be configured to transmit the mapped control signal to the external device.

Figure 3:
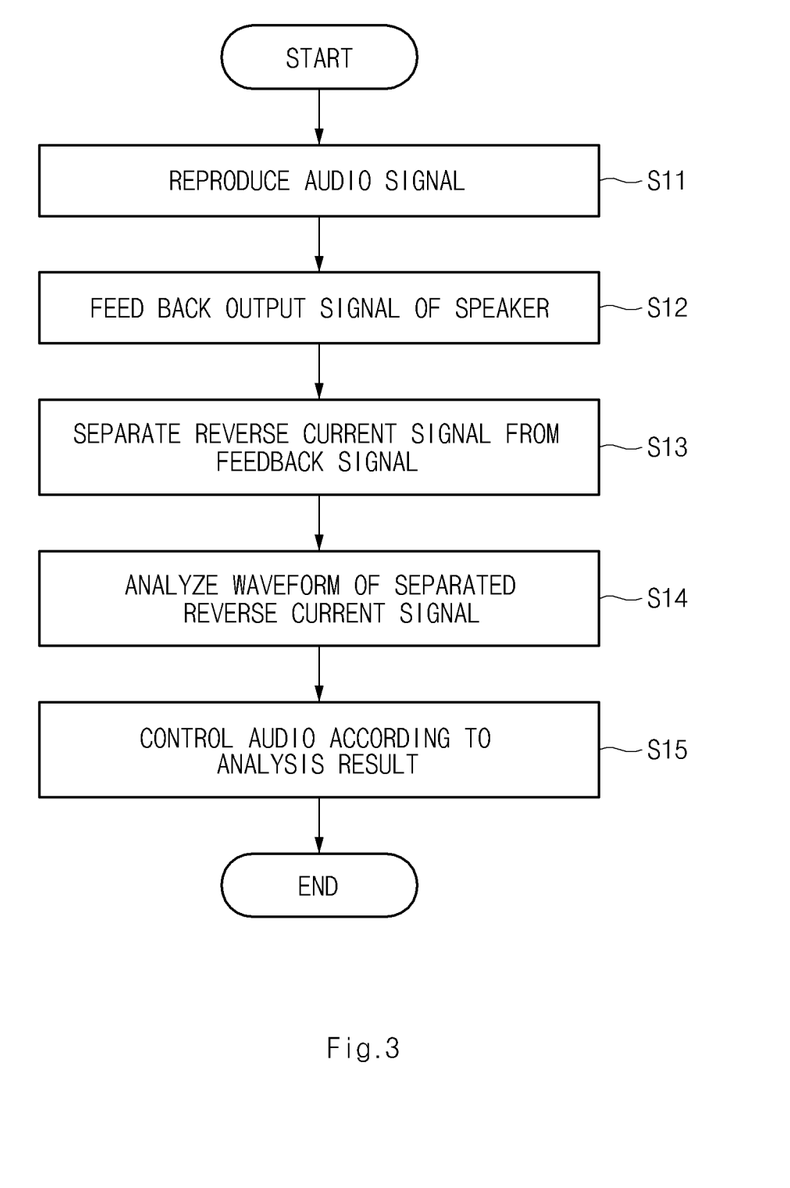
FIG. 3 is an exemplary flow chart illustrating a user interface method using a speaker according to an exemplary embodiment of the present invention.

FIG. 3 is an exemplary flow chart illustrating a user interface method using a speaker according to an exemplary embodiment of the present invention, and FIGS. 4A-4C are exemplary graphs illustrating waveforms of a reverse current signal according to external impact related to the exemplary embodiment of the present invention. In the present exemplary embodiment, an example in which an operation of an audio system is controlled will be described.

Referring to FIG. 3, the user interface apparatus, executed by a controller, may be configured to receive feedback of an audio signal output via the speaker 20 (S11, S12). In the present exemplary embodiment, an example in which the audio signal output via the speaker 20 is fed back during playback of music is described, but the impact sound wave recognizer 40 of the user interface apparatus may be configured to receive feedback of the audio signal output via the speaker 20 continuously regardless of audio output. In other words, even when there is no audio signal output via the speaker 20, the impact sound wave recognizer 40 may be configured to receive feedback of a reverse current signal generated by an impact sound wave due to external impact of the speaker 20.

The user interface apparatus may be configured to separate the reverse current signal synthesized in the feedback audio signal (S13). In particular, the impact sound wave recognizer 40 may be configured to compare the audio signal fed back from the speaker 20 with an audio signal output from the audio output unit 10 and extract a reverse current signal included in the feedback audio signal. The reverse current signal may be a sound wave generated by a user input (e.g., tapping) input via the user input pad 30 constituting the exterior of the speaker 20. Further, the reverse current signal may be a sound wave generated from the user input pad 30 due to impact applied to the user input pad 30 of the speaker 20.

Figure 4:
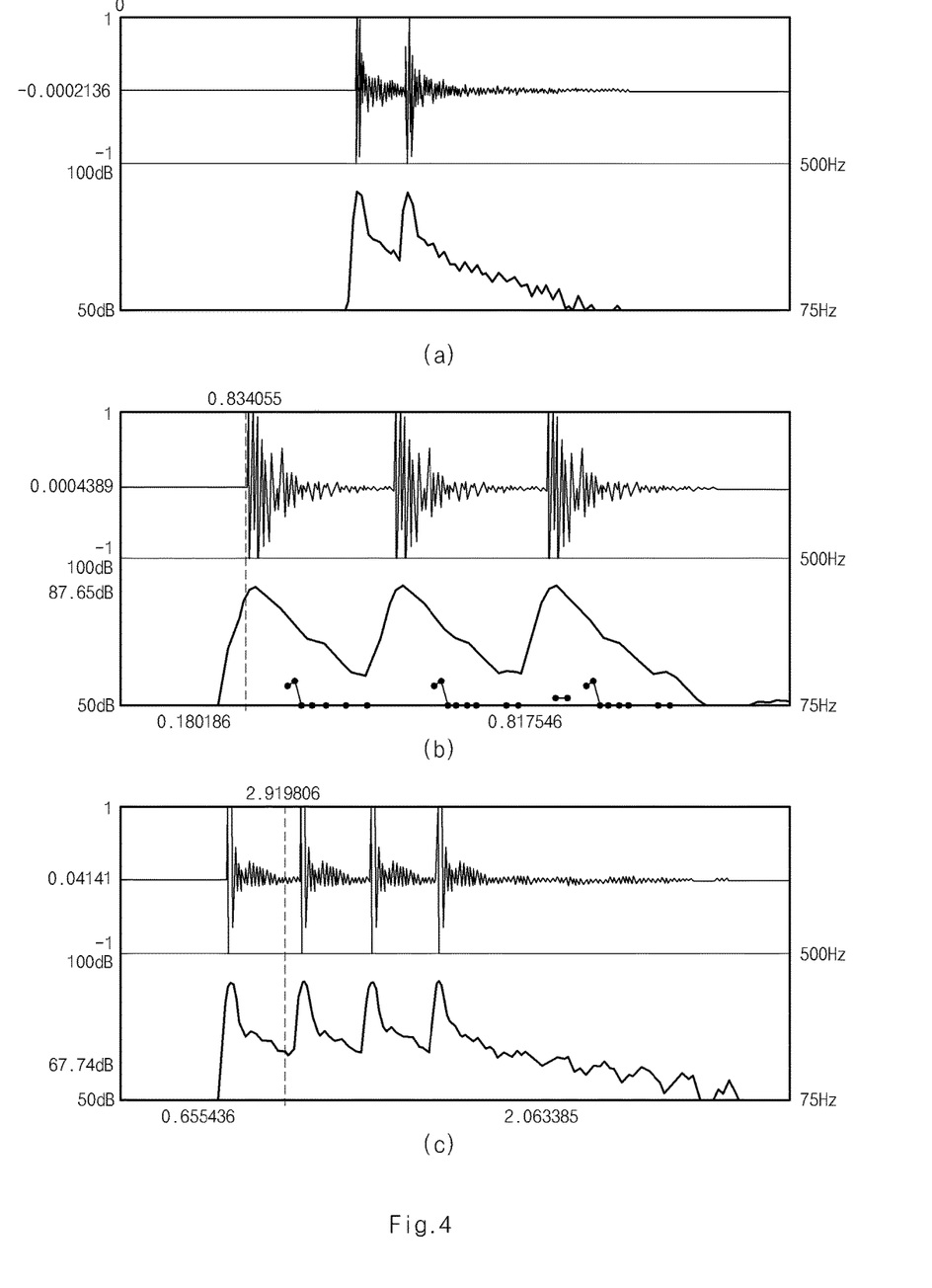
FIGS. 4A-4C are exemplary graphs illustrating waveforms of a reverse current signal according to external impact related to an exemplary embodiment of the present invention.

The controller 50 of the user interface apparatus may be configured to analyze a waveform of the reverse current signal which has been separated by the impact sound wave recognizer 40 (S14). In other words, the controller 50 may be configured to recognize a strength of a user input (e.g., external impact), the number of occurrences of user input, an interval between user inputs, an input tool, and the like by analyzing the waveforms of the reverse current signal as illustrated in FIG. 4, and thus may be configured to recognize a corresponding user input pattern. Additionally, the controller 50 may be configured to output a control signal that corresponds to the waveform analysis results to control an audio output (S15). In particular, the controller 50 may be configured to map a control signal based on the user input pattern, and transmit the mapped control signal to the audio output unit 10. The audio output unit 10 may be executed by the controller 50 to operate an audio output (e.g., playback/stop, playback of next piece of music, playback of previous piece of music, fast forward, and the like) based on the control signal transmitted from the controller 50.

In the present exemplary embodiment, an example in which the audio output is controlled based on the user input pattern input via the speaker is described, but the present invention is not limited thereto and it may be implemented such that an operation of a device having a speaker or a device connected to the user interface apparatus proposed in the present exemplary embodiment is controlled. For example, when the user interface apparatus according the exemplary embodiment of the present invention is applied to a navigation device, power of the navigation device may be turned on or off through a behavior of tapping the exterior of a speaker of the navigation device with a finger or other input device. In addition, the control signal may be modified based on a device type to which the user interface apparatus may be applied.

As described above, since the user interface apparatus according the exemplary embodiment of the present invention may be configured to sense a user input using a reverse current generated due to an impact sound wave applied to the exterior of the speaker 20, a separate sensor or button for sensing a user input may be eliminated. In addition, according to the user interface apparatus according the exemplary embodiment of the present invention, the user may stop music which has been played or play music which has been stopped, by tapping the exterior of the speaker 20 once. The user may also variously control audio such as playback of a next piece of music, playback of a previous piece of music, volume-up, volume-down, and the like, by adjusting the number of times of tapping and an interval between occurrences of tapping.

Furthermore, by associating the user interface apparatus to a voice recognition function, the user may execute the voice recognition function by simply tapping the exterior of the speaker 20 without having to select a separate button to execute the command or function. In particular, for devices such as home appliances, navigation devices, mobile terminals, and the like, voice announcement, release of alarm, and the like, may be controlled via the speaker 20 without having to configure an operation button. When a main body of an audio system is disposed at a substantial distance (e.g., more than a predetermined distance) from speakers, like a theater, a manager may discriminate whether speaker experience an error and whether sound sources fail at a scene and perform controlling, without having to move toward the speaker to check operations of individual speakers.

According to the exemplary embodiment of the present invention, an operation of a device may be controlled rapidly through a behavior of tapping the exterior of a speaker. Further, without a separate sensor for sensing impact applied to the exterior of the speaker due to the behavior of tapping the exterior of the speaker, the impact applied to the exterior of the speaker may be sensed and an operation of the device may be controlled based on an impact pattern thereof. For controlling an audio signal output to several speakers, when front/back and left/right stereoscopic sound is tuned or equalized, the audio signal may be directly controlled by tapping the exterior of a directly related speaker, providing user convenience.

Moreover, the user interface apparatus may be applied to various devices including a speaker, such as electronic devices, home appliances, automobiles, and the like. Furthermore, when the user interface apparatus according to the exemplary embodiment of the present invention is applied to an audio system, the audio system may be controlled in an emergency situation through a behavior of tapping the exterior of a speaker. The user interface apparatus may be applied to an entertainment function a music playback style may be changed based on a tapping pattern when the exterior of the speaker is tapped according to a music beat or dynamics It should be interpreted that the scope of the present invention is defined by the following claims rather than the above-mentioned detailed description and all modifications or alterations deduced from the meaning, the scope, and equivalences of the claims are included in the scope of the present invention.

SYMBOL OF EACH OF THE ELEMENTS IN THE FIGURES

10: AUDIO OUTPUT UNIT
40: IMPACT SOUND WAVE RECOGNIZER
50: CONTROLLER
S11: REPRODUCE AUDIO SIGNAL
S12: FEED BACK OUTPUT SIGNAL OF SPEAKER
S13: SEPARATE REVERSE CURRENT SIGNAL FROM FEEDBACK SIGNAL
S14: ANALYZE WAVEFORM OF SEPARATED ED REVERSE CURRENT SIGNAL
S15: CONTROL AUDIO ACCORDING TO ANALYSIS RESULT

What is claimed is:

1. A user interface apparatus using a speaker, comprising:
a user input pad that forms at least a portion of the exterior of the speaker and configured to generate an impact sound wave based on an external impact, wherein the user input pad transmits the impact sound wave to a vibration plate of the speaker;
an impact sound wave recognizer configured to receive a feedback of an output signal output via the speaker and separate a reverse current signal due to the impact sound wave included in the feedback signal, wherein the reverse current signal is generated by electromagnetic induction based on movement of a voice coil of the speaker due to transmission of the impact sound wave by the user input pad to the vibration plate of the speaker; and
a controller configured to analyze a waveform of the reverse current signal separated by the impact sound wave recognizer to recognize a user input pattern, and output a control signal that corresponds to the recognized user input pattern.

2. The user interface apparatus according to claim 1, wherein the impact sound wave is a sound wave generated in response to a tap or flick from a user input pad by using an input tool such as a finger, a stick, a rubber, or a pen.

3. The user interface apparatus according to claim 1, wherein the reverse current signal is a signal generated based on a change in a movement of the voice coil of the speaker due to the impact sound wave.

4. The user interface apparatus according to claim 3, wherein when an audio signal output via the speaker exists, the reverse current signal distorts the audio signal.

5. The user interface apparatus according to claim 1, wherein the impact sound wave recognizer is configured to compare the feedback signal with an audio signal output from an audio output unit to the speaker and extracts a signal of a different region.

6. The user interface apparatus according to claim 1, wherein the controller is configured to recognize a user input pattern based on a strength of the external impact, number of occurrences of the external impact, interval between the occurrences of the external impact, and an input unit, and is configured to map a control signal that corresponds to the user input pattern.

7. A user interface method using a speaker, comprising:
receiving, by a controller, a feedback of an output signal output via the speaker;
separating, by the controller, a reverse current signal from the feedback output signal, wherein the reverse current signal is generated by electromagnetic induction based on movement of a voice coil of the speaker due to transmission of an impact sound wave to a vibration plate of the speaker, the impact sound wave generated based on user input applied to an exterior of the speaker;
analyzing, by the controller, a waveform of the separated reverse current signal; and
outputting, by the controller, a control signal that corresponds to a user input pattern recognized from the waveform analysis.

8. The user interface method according to claim 7, wherein the user input is a sound wave generated in response to a tap or flick to the exterior of the speaker using an input tool such as a finger, a stick, a rubber, or a pen.

9. The user interface method according to claim 7, wherein, in the separating of the reverse current signal, the feedback signal from the speaker is compared with an audio signal transmitted to the speaker, and a signal of a region different from the audio signal transmitted to the speaker is extracted from the feedback signal.

10. The user interface method according to claim 7, wherein, in the analyzing of the waveform, the user input pattern is recognized based on a strength of the user input, number of occurrences of the user inputs, an interval between the user inputs, and an input unit through the waveform of the separated reverse current signal.

11. The user interface method according to claim 7, wherein, in the outputting of the control signal, the control signal mapped based on the user input pattern and a device type is output.

12. A non-transitory computer readable medium containing program instructions executed by a controller, the computer readable medium comprising:
- program instructions that receive a feedback of an output signal output via a speaker;
- program instructions that separate a reverse current signal from the feedback output signal, wherein the reverse current signal is generated by electromagnetic induction based on movement of a voice coil of the speaker due to transmission of an impact sound wave to a vibration plate of the speaker, the impact sound wave generated based on user input applied to an exterior of the speaker;
- program instructions that analyze a waveform of the separated reverse current signal; and
- program instructions that output a control signal that corresponds to a user input pattern recognized from the waveform analysis.

13. The non-transitory computer readable medium of claim 12, wherein the user input is a sound wave generated in response to a tap or flick to the exterior of the speaker using an input tool such as a finger, a stick, a rubber, or a pen.

14. The non-transitory computer readable medium of claim 12, wherein, in the program instructions that separate the reverse current signal, the feedback signal from the speaker is compared with an audio signal transmitted to the speaker, and a signal of a region different from the audio signal transmitted to the speaker is extracted from the feedback signal.

15. The non-transitory computer readable medium of claim 12, wherein, in the program instructions that analyze the waveform, the user input pattern is recognized based on a strength of the user input, number of occurrences of the user inputs, an interval between the user inputs, and an input unit through the waveform of the separated reverse current signal.

16. The non-transitory computer readable medium of claim 12, wherein, in the program instructions that output the control signal, the control signal mapped based on the user input pattern and a device type is output.

* * * * *